(12) United States Patent
Wu et al.

(10) Patent No.: US 10,881,957 B2
(45) Date of Patent: Jan. 5, 2021

(54) SCENE AUDIO EFFECT CONTROLLING METHOD AND APPARATUS

(71) Applicant: Tencent Technology (Shenzhen) Company Limited, Shenzhen (CN)

(72) Inventors: Xiayu Wu, Shenzhen (CN); Rong Wan, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 1010 days.

(21) Appl. No.: 15/207,644

(22) Filed: Jul. 12, 2016

(65) Prior Publication Data

US 2016/0317929 A1 Nov. 3, 2016

Related U.S. Application Data

(63) Continuation of application No. PCT/CN2015/071395, filed on Jan. 23, 2015.

(30) Foreign Application Priority Data

Jan. 23, 2014 (CN) .......................... 2014 1 0032529

(51) Int. Cl.
*A63F 9/24* (2006.01)
*A63F 13/54* (2014.01)
*A63F 13/55* (2014.01)

(52) U.S. Cl.
CPC .............. *A63F 13/54* (2014.09); *A63F 13/55* (2014.09)

(58) Field of Classification Search
CPC ................................ A63F 13/54; A63F 13/55
See application file for complete search history.

(56) References Cited

U.S. PATENT DOCUMENTS 5,926,400 A * 7/1999 Kytle ..................... G06F 3/011
  381/18
7,104,885 B2  9/2006 Reimer
(Continued)

FOREIGN PATENT DOCUMENTS

CN  101196924 A  6/2008
CN  101667227 A  3/2010
(Continued)

OTHER PUBLICATIONS

Unity (game engine). Wikipedia.org. Online. May 23, 2013. Accessed via the Internet. Accessed Jun. 13, 2019. <URL: https://en.wikipedia.org/w/index.php?title=Unity_(game_engine)&oldid=556355499> (Year: 2013).*

(Continued)

*Primary Examiner* — Dmitry Suhol
*Assistant Examiner* — Carl V Larsen
(74) *Attorney, Agent, or Firm* — Anova Law Group, PLLC (57) ABSTRACT

The present disclosure discloses a scene audio effect controlling method and apparatus. The method includes: setting an intersection area between a first scene and a second scene, where the intersection area includes a first parameter control line for performing audio effect control on the first scene and a second parameter control line for performing audio effect control on the second scene; determining a position parameter of a game role in the intersection area; determining, respectively on the first parameter control line and the second parameter control line, a first scene audio effect control parameter and a second scene audio effect control parameter that correspond to the position parameter; and setting a first scene audio effect according to the first scene audio effect control parameter and setting a second scene (Continued)

audio effect according to the second scene audio effect control parameter.

9 Claims, 8 Drawing Sheets (56) References Cited

U.S. PATENT DOCUMENTS

| | | | |
|---|---|---|---|
| 9,674,611 B2 | 6/2017 | Fujisawa et al. | |
| 9,711,126 B2 | 7/2017 | Mehra et al. | |
| 2005/0182608 A1* | 8/2005 | Jahnke | A63F 13/10 703/6 |
| 2010/0049346 A1* | 2/2010 | Boustead | A63F 13/12 700/94 |
| 2012/0263310 A1 | 10/2012 | Fournel | |
| 2013/0150162 A1 | 6/2013 | Freund et al. | |
| 2014/0100839 A1* | 4/2014 | Arendash | G06F 17/5009 703/21 |
| 2017/0165576 A1* | 6/2017 | Ballard | A63F 13/57 |
| 2018/0359591 A1* | 12/2018 | Bygrave | H04S 7/303 |

FOREIGN PATENT DOCUMENTS

| | | |
|---|---|---|
| CN | 102479506 A | 5/2012 |
| EP | 2 468 371 A1 | 6/2012 |
| EP | 2 613 570 A1 | 10/2013 |
| WO | WO 2009/151777 A2 | 12/2009 |
| WO | WO 2013/184215 A2 | 12/2013 |

OTHER PUBLICATIONS

Sound. Docs.huihoo.com. Online. Nov. 16, 2007. Accessed via the Internet. Accessed Jun. 13, 2019. <URL: https://docs.huihoo.com/unity/4.3/Documentation/Manual/Sound.html> (Year: 2007).*

Reverb Zones. Docs.huihoo.com. Online. Apr. 9, 2013. Accessed via the Internet. Accessed Jun. 13, 2019. <URL: https://docs.huihoo.com/unity/4.3/Documentation/Components/class-AudioReverbZone.html> (Year: 2013).*

Audio Sources & Listeners—Unity Official Tutorials. Youtube.com. Online. Apr. 8, 2013. Accessed via the Internet. Accessed Jun. 13, 2019. <URL: https://www.youtube.com/watch?v=1BMJFgK68IU> (Year: 2013).*

Unreal Engine. Wikipedia.org. Online. Dec. 11, 2012. Accessed via the Internet. Accessed Jul. 18, 2020. <URL: https://en.wikipedia.org/w/index.php?title=Unreal_Engine&oldid=527564366> (Year: 2012).*

International Search Report and Written Opinion for PCT/CN2015/071395 dated Apr. 28, 2015 (11 pgs).

Extended European Search Report for corresponding European Patent Application No. 15740966.5 dated Oct. 30, 2017, 1-10 pages.

Stevens, R. et al., "The Game Audio Tutorial," ISBN: 978-0-240-81726-2, Published 2011, 5 pages.

Office Action dated May 15, 2019 for Chinese Application No. 201410032529.1, 30 pages.

* cited by examiner

SCENE AUDIO EFFECT CONTROLLING METHOD AND APPARATUS

RELATED APPLICATION

This application is a continuation of International Application No. PCT/CN2015/071395, filed on Jan. 23, 2015, which claims priority to Chinese Patent Application No. 201410032529.1, filed on Jan. 23, 2014, both of which are incorporated by reference in their entirety.

FIELD OF THE TECHNOLOGY

The present disclosure relates to the field of Internet technologies, and in particular, to a scene audio effect controlling method and apparatus.

BACKGROUND OF THE DISCLOSURE

During the development of a game by a game designer, besides the design and development of necessary content such as scenes, characters, and rules, another important part is the development of a scene audio effect. Setting of the scene audio effect usually includes setting of an environment audio effect parameter, setting of an object audio effect parameter, and setting of a user interface (UI) prompt audio effect parameter. The environment audio effect refers to a sound effect produced by a game environment. For example, sounds such as a bird tweet, the sound of running water, the sound of wind can be heard when a game role is in a forest scene. The object audio effect refers to a sound effect produced by an article, associated with an action of the game role, in the scene. For example, when the game role shoots at a wooden case, the crackling sound generated from cracking of the wooden case is the object audio effect. For another example, when the game role drives a car off the cliff, the sound made by the car hitting the rocks is also the object audio effect. The UI prompt audio effect refers to an auxiliary prompt sound made upon the action of the game role, and usually includes an upgrade prompt sound, a prop acquisition prompt sound, and so on.

To restore the sound effect of a real scene, it is usually necessary to reverberate the set audio effects after the scene audio effects are developed. An experienced game designer sets a reverberation value according to factors such as the space size of the scene, the position of an article, and the material of the article, so as to design a set of scene audio effects as real as possible.

In the foregoing process of developing scene audio effects, audio effects are usually set independently for separate scenes only, and the sound effects of different scenes are unrelated. In the actual process of a game, a game role often thrusts in different scenes, for example, going from an outdoor scene into an indoor scene. Because audio effects are set independently for different scenes, the scene audio effect in a switching area (for example, at the door) between the scenes is chaotic, and an "overlapping" situation in which audio effects of two scenes are played at the same time or a "vacuum" situation in which the audio effect of neither scene is played may occur, thereby affecting the game experience of the player.

SUMMARY

Embodiments of the present invention provide a scene audio effect controlling method and apparatus, which can solve the problem of a chaotic audio effect in a switching area caused by independent setting of scene audio effects.

In one aspect, an embodiment of the present invention provides a scene audio effect controlling method, including:
setting an intersection area between a first scene and a second scene, where the intersection area includes a first parameter control line for performing audio effect control on the first scene and a second parameter control line for performing audio effect control on the second scene;
determining a position parameter of a game role in the intersection area;
determining, respectively on the first parameter control line and the second parameter control line, a first scene audio effect control parameter and a second scene audio effect control parameter that correspond to the position parameter;
setting a first scene audio effect according to the first scene audio effect control parameter; and
setting a second scene audio effect according to the second scene audio effect control parameter.

In another aspect, an embodiment of the present invention further provides a scene audio effect controlling apparatus, including one or more processors; and memory having instructions stored thereon, the instructions, when executed by the one or more processors, cause the processors to perform operations:
setting an intersection area between a first scene and a second scene, where the intersection area includes a first parameter control line for performing audio effect control on the first scene and a second parameter control line for performing audio effect control on the second scene;
determining a position parameter of a game role in the intersection area;
determining, respectively on the first parameter control line and the second parameter control line, a first scene audio effect control parameter and a second scene audio effect control parameter that correspond to the position parameter;
setting a first scene audio effect according to the first scene audio effect control parameter; and
setting a second scene audio effect according to the second scene audio effect control parameter.

In the scene audio effect controlling method and apparatus provided in the embodiments of the present invention, an intersection area is set between a first scene and a second scene, a first scene audio effect control parameter and a second scene audio effect control parameter that correspond to a position of a game role are determined according to the position of the game role in the intersection area and a first parameter control line and a second parameter control line in the intersection area, and scene audio effects of the first scene and the second scene are controlled according to the first scene audio effect control parameter and the second scene audio effect control parameter respectively, so as to realize a smooth transition of the audio effect in the intersection area by jointly controlling the audio effects of the two scenes. Compared with the prior art in which scene audio effects are set independently for different scenes, a real audio effect of the switching area between scenes can be restored and a defect that the audio effect in the switching area of the scenes is chaotic can be overcome.

BRIEF DESCRIPTION OF THE DRAWINGS

To describe the technical solutions of the embodiments of the present invention or the prior art more clearly, the following briefly describes the accompanying drawings required for the embodiments or the prior art. The accompanying drawings in the following description are merely some embodiments of the present invention, and a person of ordinary skill in the art can obtain other drawings based on these accompanying drawings without creative efforts.

DESCRIPTION OF EMBODIMENTS

The following describes the technical solutions in this embodiment with reference to the accompanying drawings in this embodiment. The described embodiments are some of but not all of the embodiments of the present invention. All other embodiments obtained by a person of ordinary skill in the art based on the embodiments of the present invention without creative efforts shall fall within the protection scope of the present disclosure.

Figure 1:
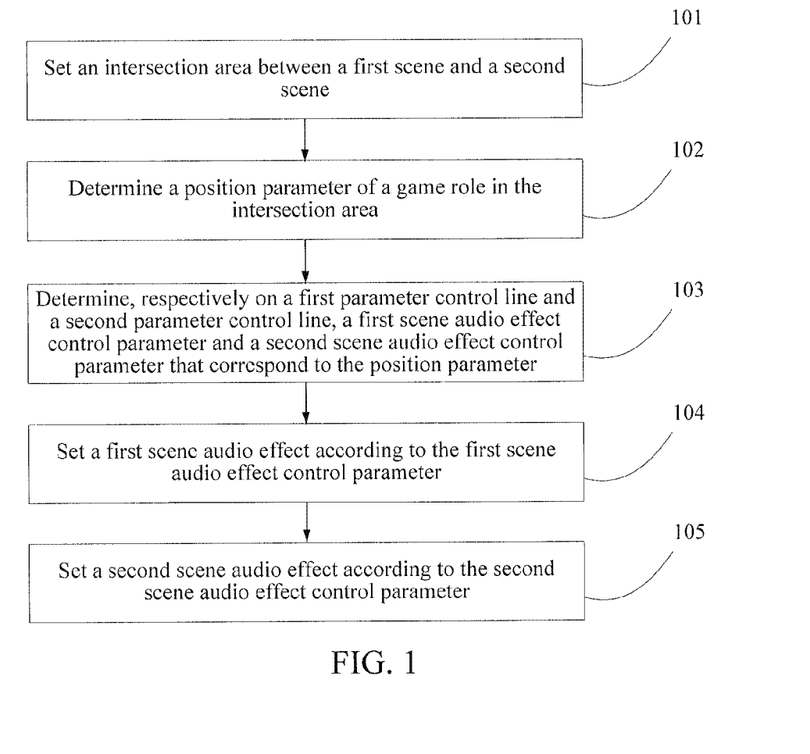
FIG. 1 is a flowchart of a scene audio effect controlling method according to an embodiment of the present invention.

An embodiment provides a scene audio effect controlling method, which realizes a smooth transition of an audio effect in an intersection area by jointly controlling audio effects of different scenes. As shown in FIG. 1, the method includes:

Step 101: Set an intersection area between a first scene and a second scene.

Figure 2:
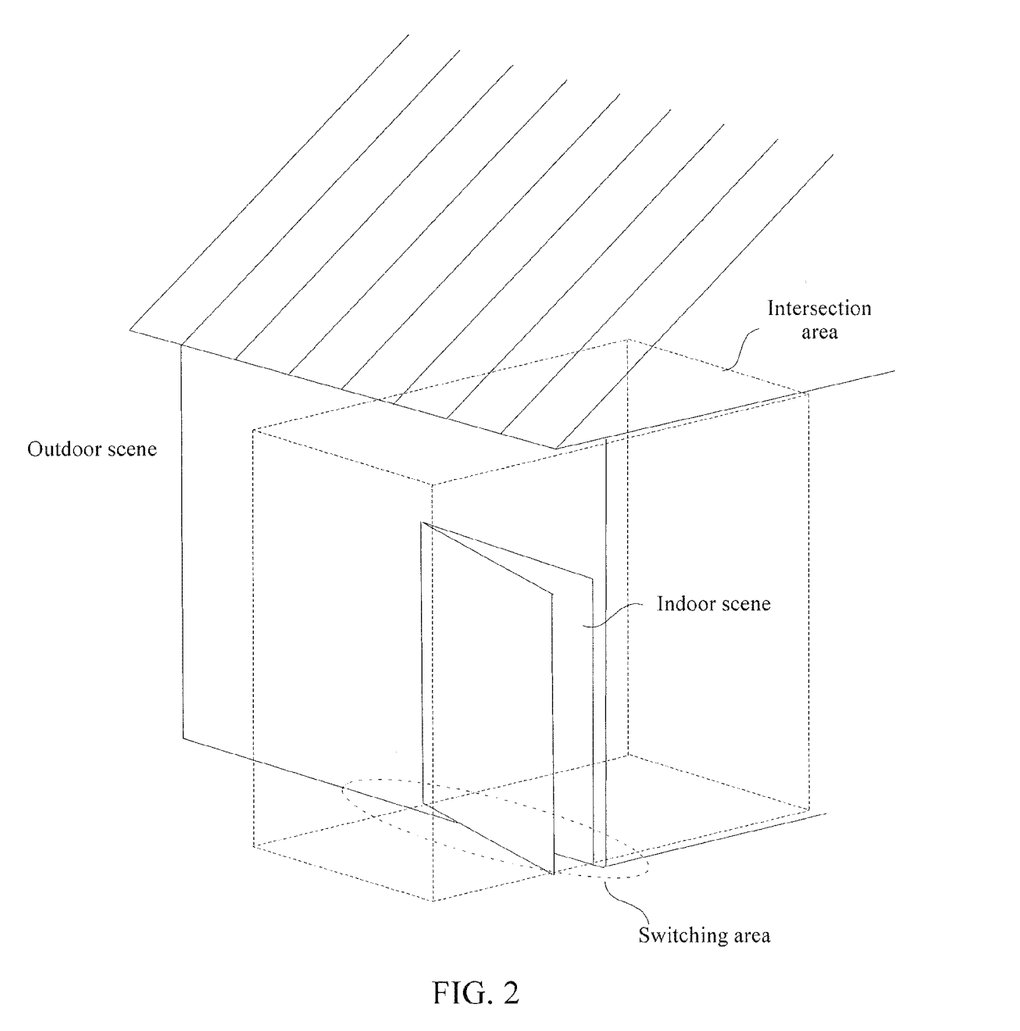
FIG. 2 is a schematic diagram of an outdoor scene, an indoor scene, and a switching area according to an embodiment of the present invention.
Figure 3A:
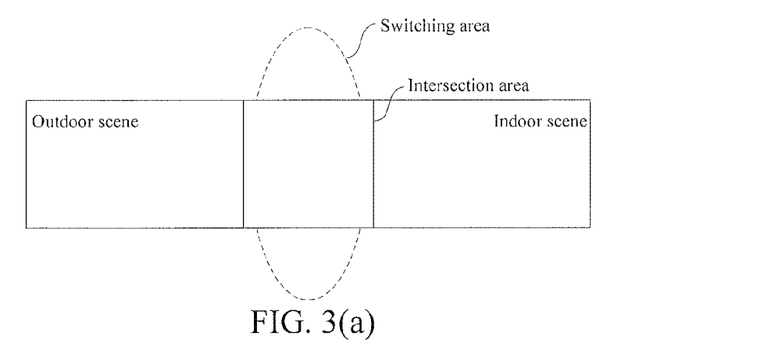
FIG. 3(a) to FIG. 3(d) are schematic diagrams of intersection areas according to an embodiment of the present invention.
Figure 3B:
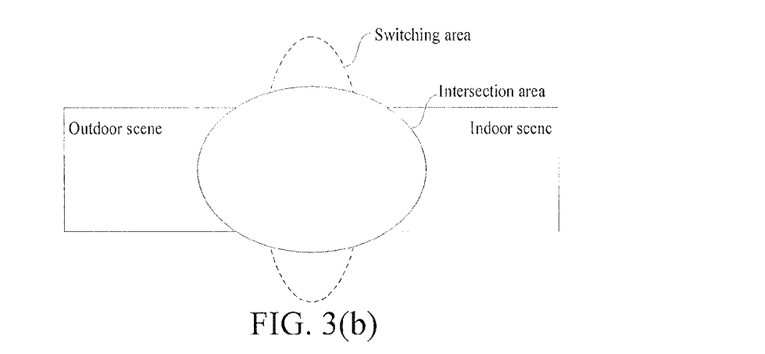
Figure 3C:
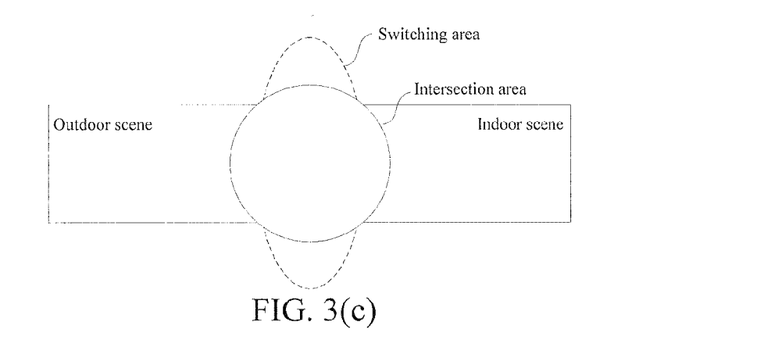
Figure 3D:
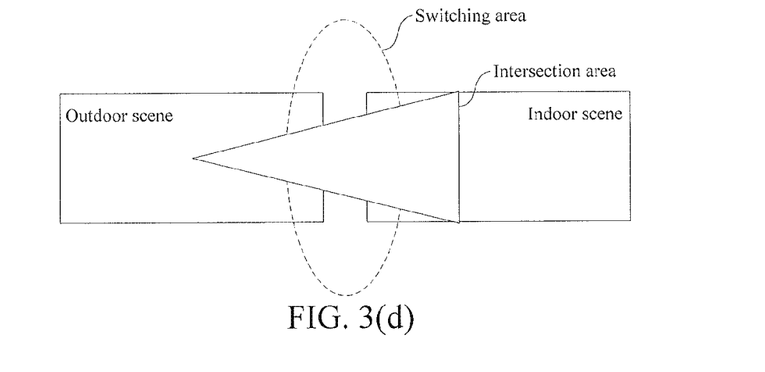
Figure 4A:
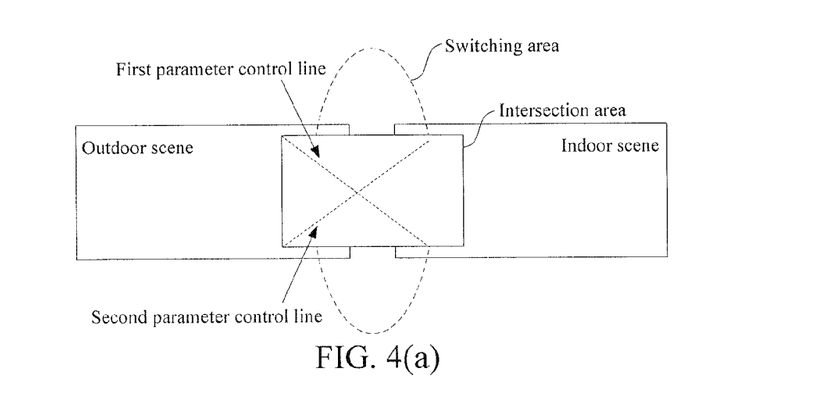
FIG. 4(a) to FIG. 4(d) are schematic diagrams of parameter control lines according to an embodiment of the present invention.
Figure 4B:
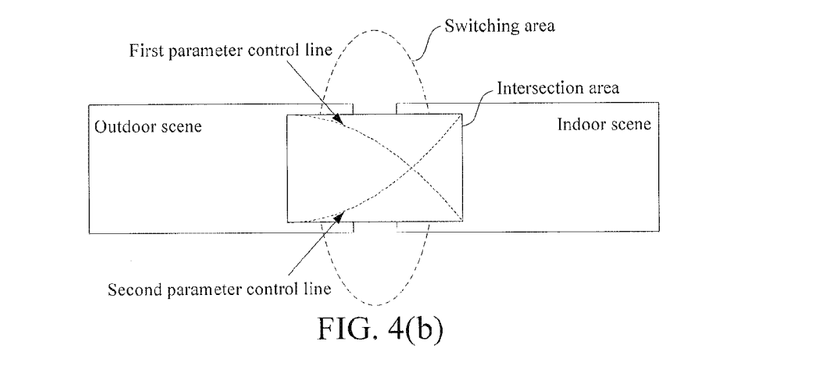
Figure 4C:
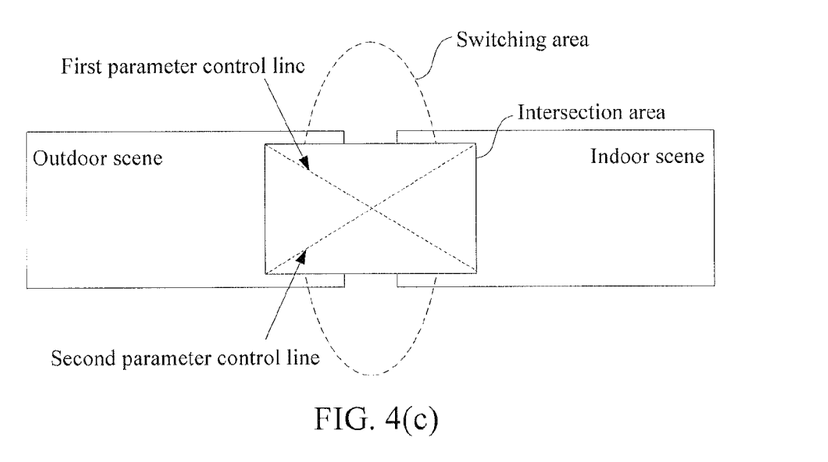
Figure 4D:
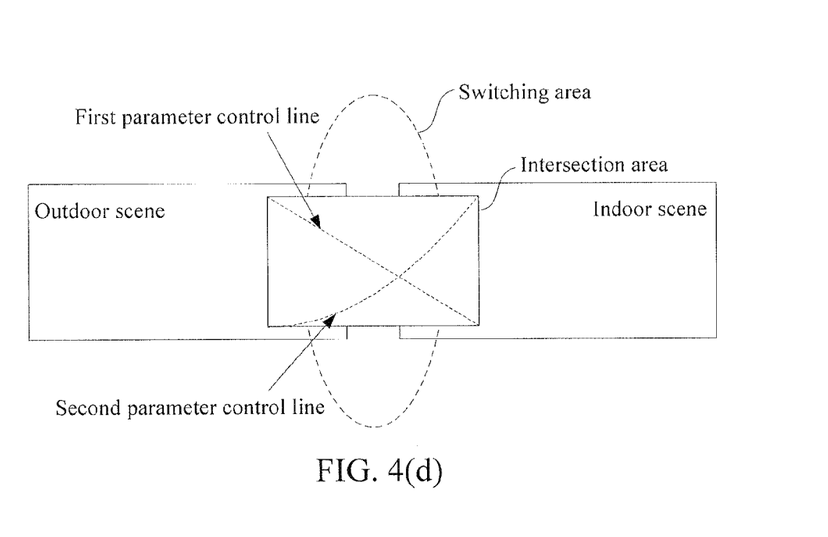

The first scene and the second scene in this embodiment are game space scenes designed by a game designer, and include a street scene, a warehouse scene, a seashore scene, and the like. As shown in FIG. 2, this embodiment is described by using an example in which an outdoor scene is the first scene and an indoor scene is the second scene, where the outdoor scene and the indoor scene respectively have designed scene audio effects. For ease of subsequent description, in this embodiment, a scene audio effect parameter of the outdoor scene is expressed as an audio effect parameter 1, and a scene audio effect parameter of the indoor scene is expressed as an audio effect parameter 2.

In FIG. 2, a switching area, for example, a door of a house exists between the outdoor scene and the indoor scene. When a game role is in the switching area, an audio effect "overlapping" or audio effect "vacuum" situation occurs under the combined influence of the audio effect parameter 1 and the audio effect parameter 2. The audio effect "overlapping" refers to that a player can hear scene audio effects of two scenes at the same time with the same sound effect (for example, a reverberation effect) in the switching area as if the player is in two scenes at the same time. The audio effect "vacuum" refers to that the player can hear the scene audio effect of neither scene in the switching area as if the player is detached from the scenes suddenly. According to the experience in real life, although people can hear the bird tweet outdoors and the sound of the television indoors at the same time when going from the outdoor to the indoor, the two sounds gradually change in volume, reverberation effect, and the like, for example, the bird tweet goes far away, while the sound of the television comes near. In order to avoid the audio effect "overlapping" or audio effect "vacuum" problem caused by abrupt or "hard switching" of the scene audio effect, in this embodiment, a control device sets an intersection area at the border (namely, the switching area) of the outdoor scene and the indoor scene, so as to jointly control the audio effect parameter 1 of the outdoor scene and the audio effect parameter 2 of the indoor scene in the intersection area, thereby achieving a smooth transition of the scene audio effect.

The intersection area is exemplarily shown in FIG. 2, where the intersection area occupies partial space of the first scene and partial space of the second scene at the same time.

It should be noted that the intersection area is an area generated by dividing the scene space from the audio (namely, audio effect) dimension by the control device, rather than a materialized real spatial area. However, for ease of description and understanding, the intersection area is concretized in the spatial dimension in this embodiment.

FIG. 3(a) to FIG. 3(d) are top views of intersection areas in four different forms. When setting an intersection area, the control device may set a size and a shape of the intersection area according to characteristics of a specific scene audio effect. In this embodiment, the setting of the intersection area is analyzed qualitatively only, and the specific form and position of the intersection area in a practical application are not limited quantitatively.

After setting the intersection area, the control device sets, in the intersection area, a first parameter control line corresponding to the outdoor scene (the first scene) and a second parameter control line corresponding to the indoor scene (the second scene). The first (second) parameter control line, as the name implies, is used to control and adjust the audio effect parameter 1 (the audio effect parameter 2) of the outdoor scene (the indoor scene) in the intersection area, so as to realize a smooth transition between the audio effect parameter 1 and the audio effect parameter 2 during movement of the game role in the intersection area. Similar to the intersection area, a parameter control line is also not a concrete division line in the spatial dimension. In fact, the parameter control line is merely a virtual line for representing a continuous mapping relationship between a position of the game role and a scene audio effect control parameter. For ease of description and understanding, the parameter control line is also concretized in the spatial dimension in this embodiment.

The first (second) parameter control line may be set to different forms according to characteristics of the actual scene. As shown in FIG. 4(a) to FIG. 4(d), using a rectangular intersection area as an example, the first (second) parameter control line may be set as a linear parameter control line, a non-linear parameter control line, a symmetrical parameter control line, or an asymmetrical parameter control line. The specific form of the parameter control line is not limited in this embodiment.

Step 102: Determine a position parameter of the game role in the intersection area.

The control device determines the position of the game role in the intersection area, and acquires a spatial position parameter corresponding to the position. This embodiment is described by using a vector parameter in a two-dimensional coordinate system as a position parameter. The position parameter may also expand to a three-dimensional coordinate system in a practical application.

Step 103: Determine, respectively on the first parameter control line and the second parameter control line, a first scene audio effect control parameter and a second scene audio effect control parameter that correspond to the position parameter.

The control device determines, respectively on the first parameter control line and the second parameter control line, the first scene audio effect control parameter and the second scene audio effect control parameter that correspond to the position parameter. The first (second) parameter control line is used to represent a correspondence relationship between the position of the game role and the first (second) scene audio effect control parameter.

In this embodiment, the possible position of the game role in the intersection area is described by using a discrete point as an example. In practical application, the control device may further refine the position sampling granularity infinitely, so that the position points in the intersection area tend to be continuous.

The first (second) scene audio effect control parameter may be a specific parameter value, for example, a low-pass filtering effect value or a reverberation value, and may also be a proportional coefficient. The specific form of the first (second) scene audio effect control parameter is not limited in this embodiment. When the first (second) scene audio effect control parameter is a proportional value, the proportional value is used to represent a ratio relationship between a scene audio effect control parameter corresponding to a position parameter and an original audio effect parameter of the scene. For example, if an original audio effect parameter of the outdoor scene is the audio effect parameter 1, an original audio effect parameter of the indoor scene is the audio effect parameter 2, all outdoor scene audio effect control parameter at a position in the intersection area is 0.3, and an indoor scene audio effect control parameter at the position in the intersection area is 0.7, it indicates that the outdoor audio effect parameter corresponding to the position is 0.3 times the audio effect parameter 1, and the indoor audio effect parameter corresponding to the position is 0.7 times the audio effect parameter 2.

In this embodiment, the ratio relationship between audio effect parameters refers to a proportional relationship between values of the audio effect parameters. For example, for an environment audio effect of a scene, when an original environment audio effect in the outdoor scene is 20 dB (an exemplary value), ran outdoor scene audio effect control parameter corresponding to a position is 0.4, it indicates that an environment audio effect of the outdoor scene at the position is 20*0.4=8 dB.

Step 104: Set a first scene audio effect according to the first scene audio effect control parameter.

Step 105: Set a second scene audio effect according to the second scene audio effect control parameter.

After acquiring an outdoor scene audio effect control parameter and an indoor scene audio effect control parameter, the control device sets an outdoor scene audio effect corresponding to a current position according to the outdoor scene audio effect control parameter, and sets an indoor scene audio effect corresponding to the current position according to the indoor scene audio effect control parameter, so as to obtain a scene audio effect of the current position under the combined influence of the outdoor scene audio effect and the indoor scene audio effect.

It should be noted that, the setting of an outdoor (or indoor) scene audio effect is not setting of an audio effect in the outdoor scene, but setting of an outdoor scene audio effect at a position of the game role in the intersection area. The outdoor scene audio effect at the position is determined by an outdoor scene audio effect control parameter instead of the audio effect parameter 1, and the sound effect thereof is also different from that in the outdoor scene, thereby achieving a result that the audio effect in the intersection area is affected jointly by the outdoor scene audio effect and the indoor scene audio effect.

The execution sequence of step 104 and step 105 is not limited in this embodiment. Generally, in a practical application, the control device performs step 104 and step 105 at the same time.

In the scene audio effect controlling method provided in this embodiment of the present invention, an intersection area is set between a first scene and a second scene, a first scene audio effect control parameter and a second scene audio effect control parameter that correspond to a position of a game role are determined according to the position of the game role in the intersection area and a first parameter control line and a second parameter control line in the intersection area, and scene audio effects of the first scene and the second scene are controlled according to the first scene audio effect control parameter and the second scene audio effect control parameter respectively, so as to realize a smooth transition of the audio effect in the intersection area by jointly controlling the audio effects of the two scenes. Compared with other methods in which scene audio effects are set independently for different scenes, a real audio effect of the switching area between scenes can be restored and a defect that the audio effect in the switching area of the scenes is chaotic can be overcome.

Figure 5:
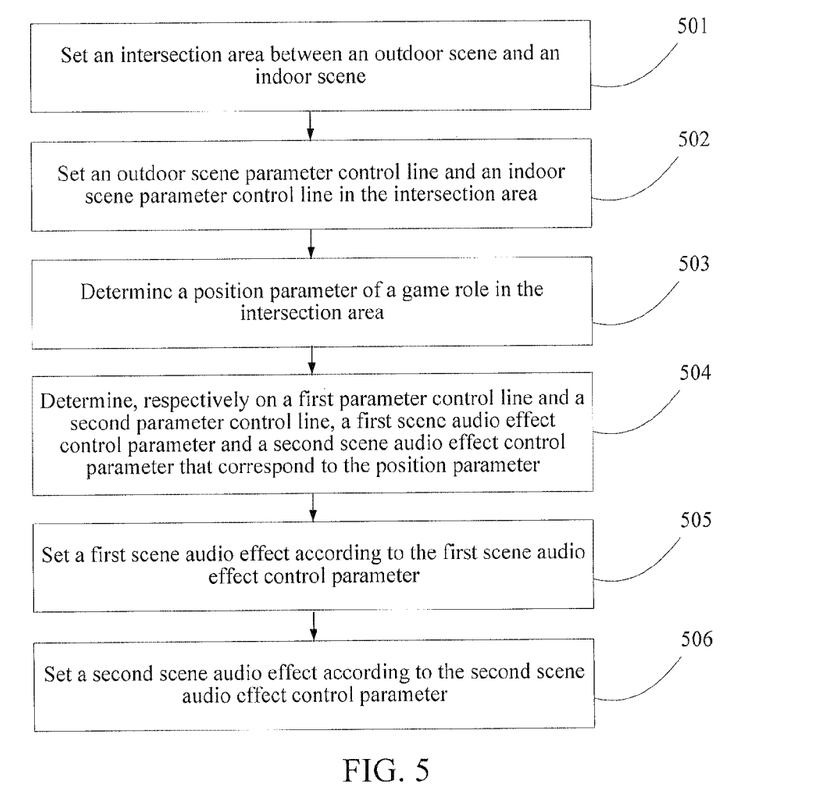
FIG. 5 is a flowchart of another scene audio effect controlling method according to an embodiment of the present invention.

Furthermore, as refinement and further extension of the method shown in FIG. 1, this embodiment further provides a scene audio effect controlling method. In this method, a manner of controlling a scene audio effect in an intersection area is described by using a low-pass filtering parameter, a scene parameter, and a reverberation parameter as an example. As shown in FIG. 5, the method includes:

Step 501: Set an intersection area between an outdoor scene and an indoor scene.

The control device sets, between the outdoor scene and the indoor scene, a rectangular intersection area shown in FIG. 2.

Step 502: Set an outdoor scene parameter control line and an indoor scene parameter control line in the intersection area.

Figure 6:
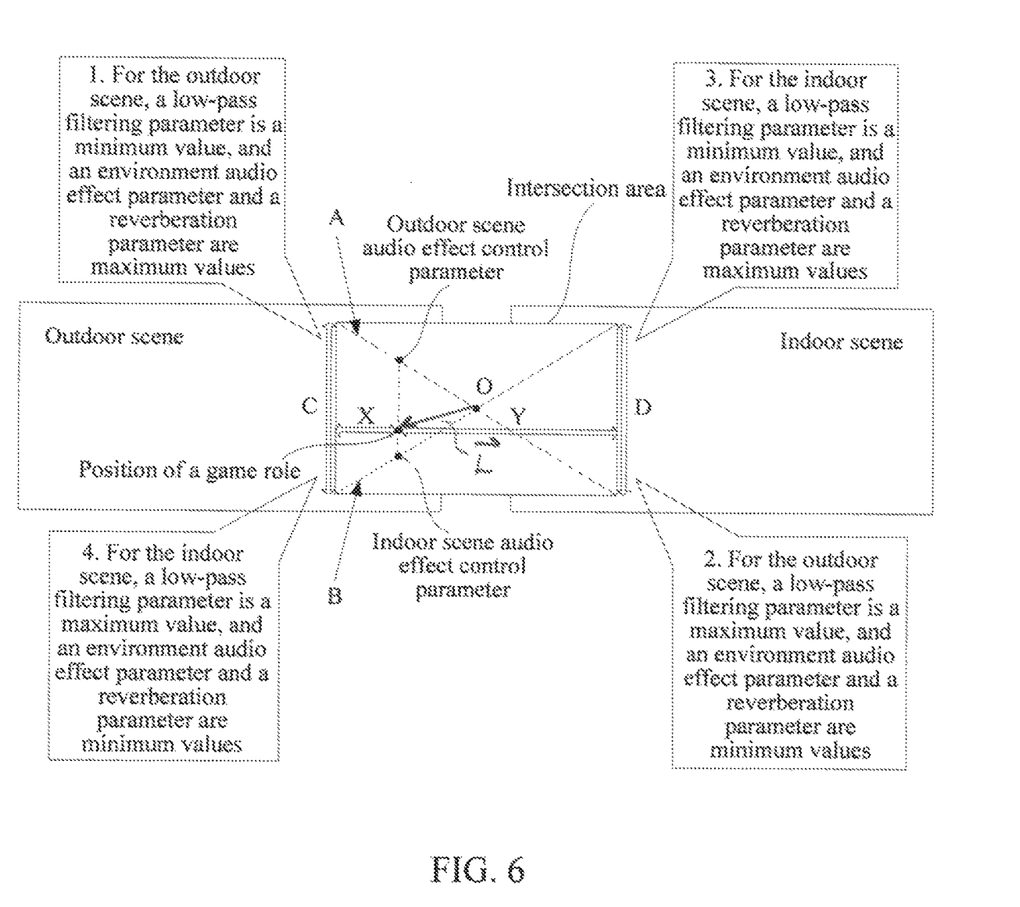
FIG. 6 is a schematic diagram of scene audio effect control according to an embodiment of the present invention.

Using a linear parameter control line as an example, the outdoor scene parameter control line and the indoor scene parameter control line that are set by the control device are shown as a line A and a line B in FIG. 6. The line A is used to represent a correspondence relationship between a distance X and an outdoor scene audio effect control parameter, the distance X is a distance between a position of a game role and a boundary C of the intersection area close to the outdoor scene, the line B is used to represent a correspondence relationship between a distance Y and an indoor scene audio effect control parameter, and the distance Y is a distance between the position of the game role and a boundary D of the intersection area close to the indoor scene.

In this embodiment, the correspondence relationship between a distance and an audio effect control parameter varies for different scene audio effect parameters. Using the parameter control line A as an example, for a low-pass filtering parameter, there is a positive correlation relationship between the distance X and the low-pass filtering parameter, that is, a farther distance from the outdoor scene indicates a greater low-pass filtering effect of the outdoor scene, thereby achieving an effect that the farther distance from the outdoor scene indicates that less high-frequency component of an outdoor scene audio effect remains. For a scene audio effect such as an environment audio effect, an object audio effect, and a UI audio effect, there is a negative correlation relationship between the distance X and the low-pass filtering parameter, that is, a farther distance from the outdoor scene indicates a less scene audio effect of the outdoor scene, thereby achieving an effect that the outdoor scene audio effect diminishes with the distance. For a reverberation audio effect, there is also a negative correlation relationship between the distance X and the low-pass filtering parameter, that is, a farther distance from the outdoor scene, indicates a less reverberation effect of the outdoor scene, thereby assisting in achieving an effect that the outdoor scene audio effect diminishes with the distance.

In the intersection area shown in FIG. 6, an effect of a natural transition of an audio effect is achieved by setting the parameter control line A and the parameter control line B, which is specifically:

Step 1. Set a low-pass filtering parameter of the outdoor scene on the boundary C to a minimum value, that is, skip performing low-pass filtering on the outdoor scene (this has the same effect as that of performing low-pass filtering in the outdoor scene); and set a scene audio effect parameter and a reverberation parameter of the outdoor scene on the boundary C to maximum values, that is, skip controlling the scene audio effect parameter and the reverberation parameter of the outdoor scene on the boundary C, so that they are the same as the audio effect parameter 1 in the outdoor scene.

Step 2. Set a low-pass filtering parameter of the outdoor scene on the boundary D to a maximum value, that is, perform low-pass filtering on the outdoor scene to the greatest extent (this has the same effect as that of performing, in the indoor scene, low-pass filtering on the outdoor scene); and set a scene audio effect parameter and a reverberation parameter of the outdoor scene on the boundary D to minimum values, that is, control the scene audio effect parameter and the reverberation parameter of the outdoor scene on the boundary D to the greatest extent, so that they have no effect in the indoor scene.

Step 3. Set a low-pass filtering parameter of the indoor scene on the boundary D to a minimum value, that is, skip performing low-pass filtering on the indoor scene (this has the same effect of performing low-pass filtering in the indoor scene); and set a scene audio effect parameter and a reverberation parameter of the indoor scene on the boundary D to maximum values, that is, skip controlling the scene audio effect parameter and the reverberation parameter of the indoor scene on the boundary D, so that they are the same as the audio effect parameter 2 in the indoor scene.

Step 4. Set a low-pass filtering parameter of the indoor scene on the boundary C to a maximum value, that is, perform low-pass filtering on the indoor scene to the greatest extent (this has the same effect as that of performing, in the outdoor scene, low-pass filtering on the indoor scene); and set a scene audio effect parameter and a reverberation parameter of the indoor scene on the boundary C to minimum values, that is, control the scene audio effect parameter and the reverberation parameter of the indoor scene on the boundary C to the greatest extent, so that they have no effect in the outdoor scene.

In one implementation manlier of this embodiment, the outdoor scene parameter control line A may be shown in an equation 1:

$$N_1=[(\vec{L}\cdot\vec{D}+R)\times(Max_1-Min_1)/(2\times R)+Min_1]/Max_1 \quad (1)$$

where $N_1$ is an outdoor scene audio effect control parameter, $\vec{L}$ is a vector from a central point O of the intersection area to a position of a game role, $\vec{D}$ is a vector from the central point O of the intersection area pointing to a facing direction of the game role, R is half of a distance between the boundaries of the intersection area, that is, half of a long boundary of the rectangular intersection area, $Max_1$ is a maximum value of the outdoor scene audio effect control parameter, where $Max_1$ may be the audio effect parameter 1 of the outdoor scene in a practical application, and $Min_1$ is a minimum value of the outdoor scene audio effect control parameter, for example, 0.

The indoor scene parameter control line B may be shown in an equation 2:

$$N_2=[(\vec{L}\cdot\vec{D}+R)\times(Max_2-Min_2)/(2\times R)+Min_2]/Max_2 \quad (2)$$

where $N_2$ is an indoor scene audio effect control parameter, $\vec{L}$ is a vector from the central point O of the intersection area to the position of the game role, $\vec{D}$ is a vector from the central point O of the intersection diva pointing to the tacing direction of the game role, R is half of a distance between the boundaries of the intersection area, that is, half of the long boundary of the rectangular intersection area, $Max_2$ is a maximum value of the indoor scene audio effect control parameter, where $Max_2$ may be the audio effect parameter 2 of the indoor scene in practical application, and $Min_2$ is a minimum value of the indoor scene audio effect control parameter, for example, 0.

Step 503: Determine a position parameter of the game role in the intersection area.

Using a position parameter in a two-dimensional coordinate system as an example, the control device determines current $\vec{L}$ and $\vec{D}$ of the game role.

Step 504: Determine, respectively on a first parameter control line and a second parameter control line, a first scene audio effect control parameter and a second scene audio effect control parameter that correspond to the position parameter.

In one implementation manner of this embodiment, the control device may substitute the current $\vec{L}$ and $\vec{D}$ of the game role into the equation 1 represented by the parameter control line A, to obtain through calculation the outdoor scene audio effect control parameter $N_1$, and substitute the current $\vec{L}$ and $\vec{D}$ of the game role into the equation 2 represented by the parameter control line B, to obtain through calculation the indoor scene audio effect control parameter $N_2$.

Optionally, in another implementation manner of this embodiment, when the scene audio effect control parameter is a proportional value, only one parameter control line may be set in the intersection area, for example, the parameter control line A shown in FIG. 6 is set. When determining the scene audio effect control parameter, the control device may substitute the current $\vec{L}$ and $\vec{D}$ of the game role into the equation 1 represented by the parameter control line A, to obtain through calculation the outdoor scene audio effect control parameter $N_1$, and then obtain the indoor scene audio effect control parameter $N_2$ through calculation according to the following equation 3:

$$N_2 = 1 - N_1 \qquad (3)$$

Step 505: Set a first scene audio effect according to the first scene audio effect control parameter.

Step 506: Set a second scene audio effect according to the second scene audio effect control parameter The implementation manners of step 505 and step 506 are the same as those of step 104 and step 105 in FIG. 1, and will not be described herein again.

Optionally, to ensure balanced influence of the outdoor scene audio effect and the indoor scene audio effect in the intersection area, in a preferable solution of this embodiment, the control device may further set the volume of the outdoor scene audio effect and the volume of the indoor scene audio effect in the intersection area to be half of the original volumes. Specifically, after determining that the game role is in the intersection area, the control device adjusts the volume of the outdoor scene audio effect in the intersection area to be half of the volume of the audio effect in the outdoor scene, and adjusts the volume of the indoor scene audio effect in the intersection area to be half of the volume of the audio effect in the indoor scene.

In the scene audio effect controlling method provided in this embodiment of the present invention, an intersection area is set between a first scene and a second scene, a first scene audio effect control parameter and a second scene audio effect control parameter that correspond to a position of a game role are determined according to the position of the game role in the intersection area and a first parameter control line and a second parameter control line in the intersection area, and scene audio effects of the first scene and the second scene are controlled according to the first scene audio effect control parameter and the second scene audio effect control parameter respectively, so as to realize a smooth transition of the audio effect in the intersection area by jointly controlling the audio effects of the two scenes. Compared with the prior art in which scene audio effects are set independently for different scenes, a real audio effect of the switching area between scenes can be restored and a defect that the audio effect in the switching area of the scenes is chaotic can be overcome.

Figure 7:
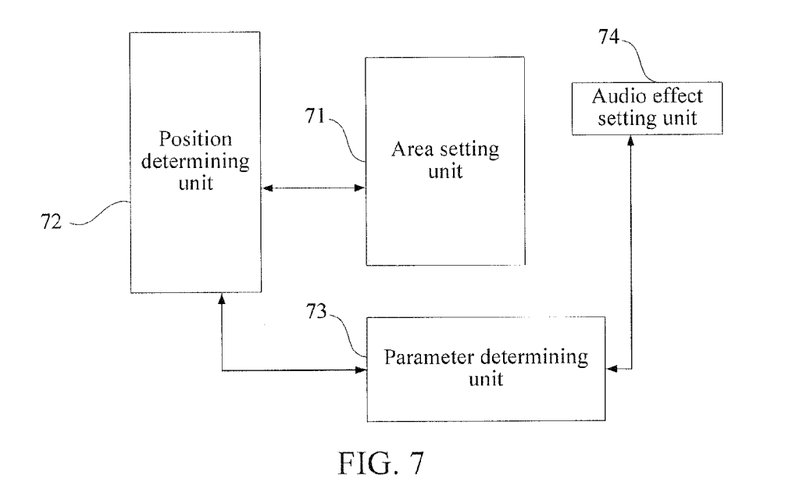
FIG. 7 is a schematic structural diagram of a scene audio effect controlling apparatus according to an embodiment of the present invention.

Furthermore, as an implementation of the method shown in FIG. 1 or FIG. 5, this embodiment further provides a scene audio effect controlling apparatus, which is configured to implement the method shown in FIG. 1 or FIG. 5. As shown in FIG. 7, the apparatus includes: an area setting unit 71, a position determining unit 72, a parameter determining unit 73, and an audio effect setting unit 74, where the area setting unit 71 is configured to set an intersection area between a first scene and a second scene, where the intersection area includes a first parameter control line for performing audio effect control on the first scene and a second parameter control line for performing audio effect control on the second scene;

the position determining unit 72 is configured to determine a position parameter of a game role in the intersection area set by the area setting unit 71;

the parameter determining unit 73 is configured to determine, respectively on the first parameter control line and the second parameter control line that are set by the area setting unit 71, a first scene audio effect control parameter and a second scene audio effect control parameter that correspond to the position parameter determined by the position determining unit 72; and the audio effect setting unit 74 is configured to set a first scene audio effect according to the first scene audio effect control parameter determined by the parameter determining unit 73, where the audio effect setting unit 74 is further configured to set a second scene audio effect according to the second scene audio effect control parameter determined by the parameter determining unit 73.

Furthermore, the area setting unit 71 is configured to:

set the first parameter control line in the intersection area, where the first parameter control line is used to represent a correspondence relationship between a distance X and the first scene audio effect control parameter, where the distance X is a distance between a position of the game role and a boundary of the intersection area close to the first scene; and set the second parameter control line in the intersection area, where the second parameter control line is used to represent a correspondence relationship between a distance Y and the second scene audio effect control parameter, where the distance Y is a distance between the position of the game role and a boundary of the intersection area close to the second scene.

Figure 8:
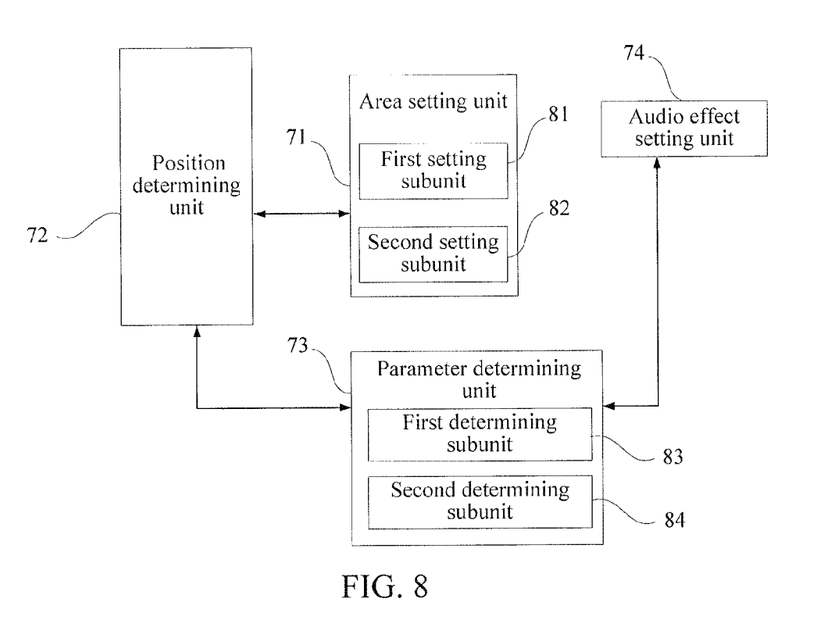
FIG. 8 is a schematic structural diagram of another scene audio effect controlling apparatus according to an embodiment of the present invention.

Furthermore, as shown in FIG. 8, the area setting unit 71 includes:

a first setting subunit 81, configured to set the first parameter control line according to the following equation 1:

$$N_1 = [(\vec{L} \cdot \vec{D} + R) \times (\text{Max}_1 - \text{Min}_1)/(2 \times R) + \text{Min}_1]/\text{Max}_1 \qquad (1)$$

where $N_1$ is the first scene audio effect control parameter, $\vec{L}$ is a vector from a central point of the intersection area to the position of the game role, $\vec{D}$ is a vector from the central point of the intersection area pointing to a facing direction of the game role, R is half of a distance between the boundaries of the intersection area, $\text{Max}_1$ is a maximum value of the first scene audio effect control parameter, mid $\text{Min}_1$ is a minimum value of the first scene audio effect control parameter; and a second setting subunit 82, configured to set the second parameter control line according to the following equation 2:

$$N_2 = [(\vec{L} \cdot \vec{D} + R) \times (\text{Max}_2 - \text{Min}_2)/(2 \times R) + \text{Min}_2]/\text{Max}_2 \qquad (2)$$

where $N_2$ is the second scene audio effect control parameter, $\vec{L}$ is the vector from the central point of the intersection area to the position of the game role, $\vec{D}$ is the vector from the central point of the intersection area pointing to the facing direction of the game role, R is half of the distance between the boundaries of the intersection area, $\text{Max}_2$ is a maximum value of the second scene audio effect control parameter, and $\text{Min}_2$ is a minimum value of the second scene mid in effect control parameter.

Furthermore, the position determining unit 72 is configured to determine current $\vec{L}$ and $\vec{D}$ of the game role.

Furthermore, as shown in FIG. 8, the parameter determining unit 73 includes:

a first determining subunit 83, configured to substitute the current $\vec{L}$ and $\vec{D}$ of the game role into the equation 1 and the equation 2 separately, to obtain through calculation the first scene audio effect control parameter $N_1$ and the second scene audio effect control parameter $N_2$.

Furthermore, as shown in FIG. 8, the parameter determining unit 73 includes:

a second determining subunit 84, configured to substitute the current $\vec{L}$ and $\vec{D}$ of the game role into the equation 1, to obtain through calculation the first scene audio effect control parameter $N_1$, and obtain the second scene audio effect control parameter $N_2$ through calculation according to the first scene audio effect control parameter $N_1$ and the following equation 3:

$$N_2 = 1 - N_1 \qquad (3).$$

In the scene audio effect controlling apparatus provided in this embodiment of the present invention, an intersection area is set between a first scene and a second scene, a first scene audio effect control parameter and a second scene audio effect control parameter that correspond to a position of a game role are determined according to the position of the game role in the intersection area and a first parameter control line and a second parameter control line in the intersection area, and scene audio effects of the first scene and the second scene are controlled according to the first scene audio effect control parameter and the second scene audio effect control parameter respectively, so as to realize a smooth transition of the audio effect in the intersection area by jointly controlling the audio effects of the two scenes. Compared with the prior art in which scene audio effects are set independently for different scenes, a real audio effect of the switching area between scenes can be restored and a defect that the audio effect in the switching area of the scenes is chaotic can be overcome.

Based on the foregoing descriptions of the embodiments, a person skilled in the art can clearly understand that the present disclosure may be implemented by software and computer hardware, and certainly may also be implemented by hardware, but in most cases, the former is the preferred implementation manner. Based on such an understanding, the technical solutions of the present disclosure essentially, or the part contributing to the prior art may be embodied in the form of a software product. The computer software product is stored in a non-volatile readable storage medium such as a floppy disk, a hard disk, or an optical disc of a computer, and includes instructions for instructing a computer device (which may be a personal computer, a server, a network device, or the like) to perform the methods in the embodiments of the present invention.

The foregoing descriptions are merely specific embodiments of the present invention, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A scene audio effect controlling method, comprising:
setting an intersection area between a first scene and a second scene, wherein the intersection area comprises a first parameter control line for performing audio effect control on the first scene and a second parameter control line for performing audio effect control on the second scene;
determining a position parameter of a game role in the intersection area;
determining, respectively on the first parameter control line and the second parameter control line, a first scene audio effect control parameter and a second scene audio effect control parameter that correspond to the position parameter, wherein the determining includes:
performing a first low-pass filtering on the first scene to obtain the second scene audio effect control parameter; and
performing a second low-pass filtering on the second scene to obtain the first scene audio effect control parameter;
setting a first scene audio effect volume in the intersection area to be half of a first audio effect volume in the first scene, and setting a second scene audio effect volume in the intersection area to be half of a second audio effect volume in the second scene;
setting a first scene audio effect according to the first scene audio effect control parameter; and
setting a second scene audio effect according to the second scene audio effect control parameter.

2. The method according to claim 1, wherein the setting an intersection area between a first scene and a second scene comprises:
setting the first parameter control line in the intersection area, wherein the first parameter control line is used to represent a correspondence relationship between a distance X and the first scene audio effect control parameter, wherein the distance X is a distance between a position of the game role and a boundary of the intersection area close to the first scene; and
setting the second parameter control line in the intersection area, wherein the second parameter control line is used to represent a correspondence relationship between a distance Y and the second scene audio effect control parameter, wherein the distance Y is a distance between the position of the game role and a boundary of the intersection area close to the second scene.

3. The method according to claim 1, wherein the first scene audio effect control parameter or the second scene audio effect control parameter comprises:
a low-pass filtering parameter, a scene audio effect parameter, and a reverberation parameter, wherein the scene audio effect parameter comprises at least one of an environment audio effect parameter, an object audio effect parameter, or a user interface (UI) prompt audio effect parameter.

4. The method according to claim 1, further comprising:
setting the first or the second parameter control line as a linear parameter control line, a non-linear parameter control line, a symmetrical parameter control line, or an asymmetrical parameter control line.

5. A scene audio effect controlling apparatus, comprising a processor and a non-volatile computer readable medium having a plurality of computer readable instructions stored thereon that, when executed by the processor, cause the processor to:
set an intersection area between a first scene and a second scene, wherein the intersection area comprises a first parameter control line for performing audio effect control on the first scene and a second parameter control line for performing audio effect control on the second scene;
determine a position parameter of a game role in the intersection area;
determine, respectively on the first parameter control line and the second parameter control line, a first scene audio effect control parameter and a second scene audio effect control parameter that correspond to the position parameter, where the step to determine includes:
performing a first low-pass filtering on the first scene to obtain the second scene audio effect control parameter; and
performing a second low-pass filtering on the second scene to obtain the first scene audio effect control parameter;

set a first scene audio effect volume in the intersection area to be half of a first audio effect volume in the first scene, and set a second scene audio effect volume in the intersection area to be half of a second audio effect volume in the second scene;

set a first scene audio effect according to the first scene audio effect control parameter; and set a second scene audio effect according to the second scene audio effect control parameter.

6. The apparatus according to claim 5, wherein setting an intersection area between a first scene and a second scene comprises:

setting the first parameter control line in the intersection area, wherein the first parameter control line is used to represent a correspondence relationship between a distance X and the first scene audio effect control parameter, wherein the distance X is a distance between a position of the game role and a boundary of the intersection area close to the first scene; and setting the second parameter control line in the intersection area, wherein the second parameter control line is used to represent a correspondence relationship between a distance Y and the second scene audio effect control parameter, wherein the distance Y is a distance between the position of the game role and a boundary of the intersection area close to the second scene.

7. A non-volatile computer-readable medium storing a computer program, wherein execution of the computer program by a computer is for:

setting an intersection area between a first scene and a second scene, wherein the intersection area comprises a first parameter control line for performing audio effect control on the first scene and a second parameter control line for performing audio effect control on the second scene;

determining a position parameter of a game role in the intersection area;

determining, respectively on the first parameter control line and the second parameter control line, a first scene audio effect control parameter and a second scene audio effect control parameter that correspond to the position parameter, wherein the determining includes:

performing a first low-pass filtering on the first scene to obtain the second scene audio effect control parameter; and performing a second low-pass filtering on the second scene to obtain the first scene audio effect control parameter;

setting a first scene audio effect volume in the intersection area to be half of a first audio effect volume in the first scene, and setting a second scene audio effect volume in the intersection area to be half of a second audio effect volume in the second scene;

setting a first scene audio effect according to the first scene audio effect control parameter; and setting a second scene audio effect according to the second scene audio effect control parameter.

8. The non-volatile computer-readable medium according to claim 7, wherein the setting an intersection area between a first scene and a second scene comprises:

setting the first parameter control line in the intersection area, wherein the first parameter control line is used to represent a correspondence relationship between a distance X and the first scene audio effect control parameter, wherein the distance X is a distance between a position of the game role and a boundary of the intersection area close to the first scene; and setting the second parameter control line in the intersection area, wherein the second parameter control line is used to represent a correspondence relationship between a distance Y and the second scene audio effect control parameter, wherein the distance Y is a distance between the position of the game role and a boundary of the intersection area close to the second scene.

9. The non-volatile computer-readable medium according to claim 7, wherein the first scene audio effect control parameter or the second scene audio effect control parameter comprises:

a low-pass filtering parameter, a scene audio effect parameter, and a reverberation parameter, wherein the scene audio effect parameter comprises at least one of an environment audio effect parameter, an object audio effect parameter, or a user interface (UI) prompt audio effect parameter.

* * * * *